US008472315B2

(12) United States Patent
Sommerville et al.

(10) Patent No.: US 8,472,315 B2
(45) Date of Patent: Jun. 25, 2013

(54) METHOD AND SYSTEM FOR CONTROLLING LINK SATURATION OF SYNCHRONOUS DATA ACROSS PACKET NETWORKS

(75) Inventors: Thomas Richard Sommerville, Nepean (CA); Sergey Plotnikov, Ottawa (CA); Kaizhen Du, Ottawa (CA)

(73) Assignee: BelAir Networks Inc. (CA)

( * ) Notice: Subject to any disclaimer, the term of this patent is extended or adjusted under 35 U.S.C. 154(b) by 198 days.

(21) Appl. No.: 12/027,894

(22) Filed: Feb. 7, 2008

(65) Prior Publication Data
US 2009/0201809 A1 Aug. 13, 2009

(51) Int. Cl.
*G01R 31/08* (2006.01)
(52) U.S. Cl.
USPC .......................................................... 370/230
(58) Field of Classification Search
USPC ............... 370/230, 230.1, 231, 352, 355, 401
See application file for complete search history.

(56) References Cited

U.S. PATENT DOCUMENTS

| 7,417,950 | B2* | 8/2008 | Hofmeister et al. | 370/230 |
|---|---|---|---|---|
| 7,774,468 | B1* | 8/2010 | Nag et al. | 709/226 |
| 2003/0009582 | A1 | 1/2003 | Qiao et al. | |
| 2003/0058871 | A1 | 3/2003 | Sastry | |
| 2003/0202469 | A1 | 10/2003 | Cain | |
| 2004/0158644 | A1* | 8/2004 | Albuquerque et al. | 709/238 |
| 2006/0002297 | A1 | 1/2006 | Sand et al. | |
| 2006/0050665 | A1 | 3/2006 | Bruckman | |
| 2006/0187829 | A1* | 8/2006 | Heiner et al. | 370/229 |
| 2007/0011352 | A1* | 1/2007 | Martini et al. | 709/239 |
| 2007/0286090 | A1* | 12/2007 | Rusmisel et al. | 370/252 |
| 2009/0052319 | A1* | 2/2009 | Muqattash et al. | 370/230.1 |

FOREIGN PATENT DOCUMENTS
WO 00/30295 A2 5/2000

OTHER PUBLICATIONS

Notification of Transmittal of the International Search Report and the Written Opinion of the International Searching Authority regarding International Application No. PCT/CA2008/000369, as mailed on Oct. 9, 2008.
Extended European Search Report for European Patent Application No. 08 71 4690 with a mailing date May 16, 2012.
Agarwal, M. K. et al., "Link utilization based AQM and its performance", Global Telecommunications Conference, 2004 (GLOBCOM '04), IEEE Dallas, TX, USA, Nov. 29-Dec. 3, 2004, vol. 2, pp. 713-718.

* cited by examiner

*Primary Examiner* — Mark Rinehart
*Assistant Examiner* — Peter Cheng
(74) *Attorney, Agent, or Firm* — Katten Muchin Rosenman LLP

(57) ABSTRACT

A method for controlling admissions of data packets across a packet network comprising the steps of establishing a communication route along a plurality of interconnected secondary nodes, determining an amount of available network and determining whether to admit the data packets to the communication route based on the determined amount of available network bandwidth. Also disclosed is a system for implementing the method comprising a first provider edge element, a second provider edge element, a plurality of interconnected secondary nodes disposed between the edge elements. Each of the secondary nodes comprises at least one first detection device for determining an amount of available network bandwidth and at least one admission device in communication with the respective first detection device for determining whether to admit the data packets to the communication route based on the determined amount of available network bandwidth.

40 Claims, 10 Drawing Sheets

METHOD AND SYSTEM FOR CONTROLLING LINK SATURATION OF SYNCHRONOUS DATA ACROSS PACKET NETWORKS

BACKGROUND OF THE INVENTION

1. Field of the Invention

The present invention relates to telecommunications network control. More specifically, the present invention relates to a method, and an accompanying system, for controlling admissions of data packets across a packet network that delivers synchronous services.

2. Background Information

Pseudo wire emulation (PWE) is a mechanism that emulates the essential attributes of a telecommunications service over a packet switched network (PSN). PWE is intended to provide only the minimum necessary functionality to emulate a wire with the required degree of faithfulness for the given service definition. The telecommunication service offered to the customer is delivered by a particular attachment circuit (AC). The service provider edge (PE) equipment translates this AC into a packet based service that can be tunneled across a PSN using the PWE protocol. The tunnel between two PE end-points is referred to as a pseudo-wire.

One of the essential attributes of the telecommunications services described above is the timing synchronization. An exemplary AC is a T1, which has a bit rate of 1.544 Mbps with a clock accuracy of +/−50 parts per million. In a cellular network case, the requirement is 1.544 Mbps with a clock accuracy of +/−50 parts per billion (the increased accuracy is necessary because it determines the accuracy of the radio frequency signal emitted by the cellular transmitter). The telecommunications network is synchronous because each network node learns the timing, i.e., synchronizes, to the preceding node in the hierarchy. The PSN does not have this characteristic. The bit rate of each link is independent. A critical feature of PWE is its ability to reconstruct the timing synchronization of the telecommunications service at the egress from the PSN. If the timing is incorrect, the reconstructed T1 may experience underflow (the data play out too quickly and the T1 runs out of data) or overflow (the data plays out too slowly and the T1 runs out of places to buffer the data and has to discard some of it). Other essential attributes of the telecommunications circuits include low delay and low error rates. Because a low delay is required, the PWE protocol does not use acknowledgements and retries to guarantee that the data successfully transited the PSN. The issue being that, if a retry is required, the replacement data will arrive too late to be forwarded on the reconstructed telecommunications service in a timely manner. Low error rates are required by the telecommunications services because errors show up as audible effects, e.g., crackles, pops, hiss and silence gaps. In the case of PWE, data lost transiting the PSN is replaced by silence or by replay of the data of the previous packet, each of which is an audible impairment of the service.

If the PSN is overloaded (a particularly acute problem when the PSN is composed of wireless links), lost packets will occur frequently. This will degrade the service potentially to the point that it is unusable. Furthermore, timing synchronization is dependent on analysis of the statistical distribution of the arriving packets. If many packets are lost, this analysis will be impossible or incorrect, resulting in timing errors that further degrade the service.

SUMMARY OF THE INVENTION

The present invention relates to a method for controlling admissions of data packets across a packet network that delivers synchronous services. In doing so, the potential for overloading is lessened. The present invention also relates to a system for implementing the method. An exemplary embodiment of the method comprises the steps of establishing a communication route from a first provider edge (PE) element to a second provider edge element with at least one primary node (connected to each edge element to establish a link) and a plurality of secondary nodes disposed between the primary nodes of the edge elements. Each secondary node establishes a link with the next successive node and the links combining to establish the communication route. The embodiment also comprises the steps of: determining an amount of available network bandwidth for transmission of the data packets across each of the links of the communication route and determining whether to admit the data packets to each of the links of the communication route based on the determined amount of available network bandwidth across the respective link. The admission determination is capable of being performed at each of the respective secondary nodes.

In one aspect, the determining an amount of available network bandwidth is capable of being performed at any of the secondary nodes.

In another aspect, the method further comprises the step of: determining whether a bi-directional flow exists across the communication route.

In another aspect, the determining whether bi-directional flow exists is capable of being performed at any of the secondary nodes.

In another aspect, the determining whether to admit is based on at least one of the determined amount of available network bandwidth across the respective link and the determination of whether bi-directional flow exists.

In another aspect, the method further comprises the step of: blocking packet flow until bi-directional flow exists.

In another aspect, the method further comprises the step of: determining whether a pseudo-wire emulation (PWE) flow exists across the communication route.

In another aspect, the determining whether PWE flow exists is capable of being performed at any of the secondary nodes.

In another aspect, the determining whether to admit is based on at least one of the determined amount of available network bandwidth across the respective link and the determination of whether PWE flow exists.

In another aspect, the method further comprises the steps of: determining whether a bi-directional flow exists across the communication route and determining whether a PWE flow exists across the communication route.

In another aspect, the determining whether to admit is based on at least one of the determined amount of available network bandwidth across the respective link, the determination of whether bi-directional flow exists and the determination of whether PWE flow exists.

In another aspect, the determining whether to admit further comprises the step of: transmitting the respective data packets across the respective link of the communication route when the determined amount of available network bandwidth is sufficient to transmit the data packets, bi-directional flow exists and PWE flow exists.

In another aspect, the method further comprises the step of: when a determination not to admit one or more data packets is made, refraining from transmitting the one or more data packets that are not admitted.

In another aspect, the method further comprises the step of: when a later determination to admit the previously non-admitted data packets is made, transmitting the previously non-admitted data packets.

In another aspect, the method further comprises the step of: discarding non-admitted packets.

In another aspect, the method further comprises the step of: determining whether bi-directional flow exists across the communication route when the amount of available network bandwidth is sufficient to transmit the data packets across the communication route.

In another aspect, the method further comprises the step of: determining whether PWE flow exists across the communication route when the amount of available network bandwidth is sufficient to transmit the data packets across the communication route.

In another aspect, the determining the availability of sufficient network bandwidth comprises the steps of: determining bandwidth available across each of the links of the communication route; determining bandwidth required to transmit the data packet across each of the links of the communication route; and comparing the required bandwidth with the respective available bandwidth for each link.

In another aspect, the method further comprises the step of: separating the packets into at least a first group of higher priority packets and second group of lower priority packets.

In another aspect, the method further comprises the steps of: dropping a flow of at least one of the lower priority packets to liberate additional bandwidth; and determining an adjusted amount of available bandwidth.

In another aspect, the admitting further comprises the step of: transmitting the respective data packets across the respective link of the communication route when the adjusted amount of available network bandwidth is sufficient to transmit the data packets across the respective link of the communication route, bi-directional flow exists, and PWE flow exists.

In another aspect, the method further comprises the step of: when a determination not to admit one or more data packets is made, refraining from transmitting the one or more data packets that are not admitted.

In another aspect, the method further comprises the step of: when a later determination to admit the previously non-admitted data packets is made, transmitting the previously non-admitted data packets.

In another aspect, the controlling of admissions operates continuously.

In another aspect, the method further comprises the step of: adjusting the determined amount of available network bandwidth across at least one of the links of the communication route. Accordingly, the step of determining the availability of sufficient network bandwidth can be repeated based upon the adjusted amount of available network bandwidth.

In another aspect, the determining the availability of sufficient network bandwidth is based upon the adjusted amount of available network bandwidth.

In another aspect, the method further comprises the step of: dropping a flow of at least one of the admitted lower priority packets in favor of a higher priority packet.

In another aspect, the method further comprises the step of: separating the packets into a plurality of groups of packets, wherein each packet is assigned a priority value and is assigned to one of the plurality of groups of packets based on the respective assigned priority value.

In another aspect, the controlling of admissions can operate continuously. In such a case, the method can include the step of continuously adjusting the determined amount of available network bandwidth.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a method, and an accompanying system, for controlling admissions of data packets across a packet switched network (PSN). In one example, pseudo-wire emulation (PWE) can be utilized as a mechanism to emulate the essential attributes of a telecommunications service (such as a T1 leased line or frame relay) over a PSN. More specifically, a particular version of PWE, such as circuit emulation service over PSN (CESoPSN) can be utilized.

Figure 1:
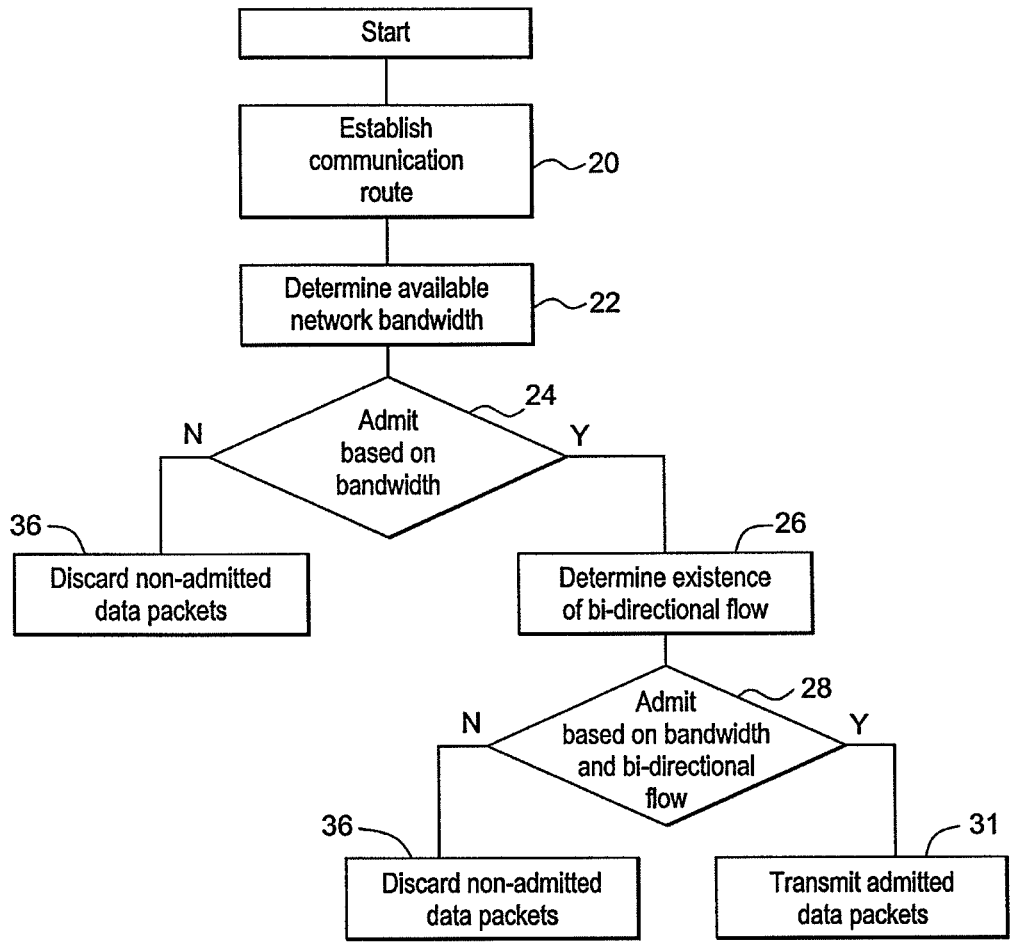
FIG. 1 is a flow diagram illustrating an embodiment of the invention including the step of determining admission based on available bandwidth and bi-directional flow.
Figure 4:
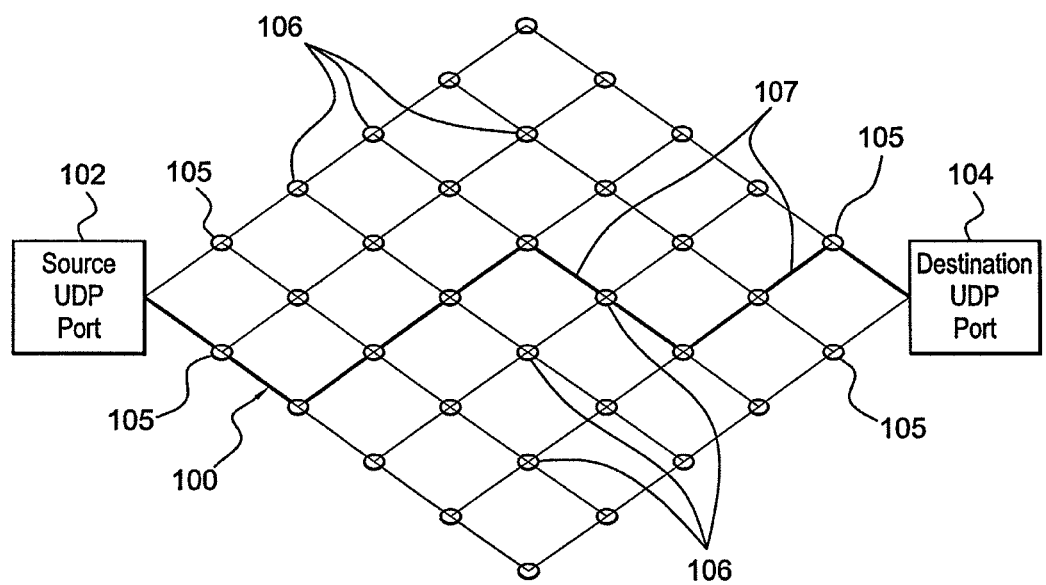
FIG. 4 is a schematic illustrating a communication route established in another embodiment of the invention.

A first preferred embodiment of the inventive method is shown schematically in FIG. 1. At step 20, a communication route is established. As shown in FIG. 4, the communication route 100 extends from a first provider edge (PE) element 102 to a second PE element 104 along a plurality of interconnected nodes 105, 106 disposed between the edge elements 102, 104. The edge elements 102, 104 of the network originate and terminate the PWE flows. Each edge element 102, 104 is connected to at least one primary node 105, thereby establishing a link 107. A plurality of secondary nodes 106 is disposed between the primary nodes 105 connected to the first and second edge elements 102, 104. Each secondary node 106 establishes a link 107 with the next successive node. Each primary node 105 establishes a link 107 with at least one of the secondary nodes 106. The links 107 combine to establish the communication route 100 between the edge elements 102, 104. Alternatively, the primary nodes 105 that are connected to the edge elements 102, 104 can be connected to one another. The nodes 105, 106 can contain packet based network interfaces that can terminate the links 107 between the nodes 105, 106. This links 107 can be wired or wireless. In a wireless embodiment, the network interfaces can be packet radio modules (RMs).

A Universal Datagram Protocol (UDP) packet has a source and destination port, each port being a 16 bit number. A UDP traffic flow consists of a series of packets from the same source port to the same destination port. It is the pair of ports which uniquely identifies the flow. When there is a return flow of packets in the reverse direction, these packets would be identified by the same two port numbers, but the with the source becoming the destination and vice versa. As an example, the first PE element sends initial traffic having source port 1 and destination port 1001 (source/destination of (1, 1001)). Accordingly, the return traffic from the second PE element will have source/destination of (1001, 1). If another PWE flow is passed between the same two end-points, that PWE flow could use source/destination (2,1002) and (1002, 2) for the initial and return traffic, respectively, to uniquely identify the packets.

In one preferred embodiment, the invention fixes one port number to a well known defined value to identify PW traffic for call admission. All traffic containing that value in one of the respective UDP port numbers is subject to call admission. Continuing with the example above, one port number is fixed to 50001. The first PW traffic flow changes from (1,1001) to (1,50001) and from (1001,1) to (50001,1). The second PW traffic flow changes from (2,1002) to (2,50001) and from (1002,2) to (50001,2). It should be noted that all the pairs are still unique and can be separated at the respective PE element 102, 104. All the pairs contain a fixed element 50001 so that they can be identified for call admission without deep packet inspection at the secondary nodes. The unique portion allows the secondary nodes to identify flows and determine if both directions are present. Alternatively, a deep packet inspection mechanism can be utilized to identify PWE packets (using the whole protocol stack), distinguish flows, and drop or admit as necessary.

Figure 5:
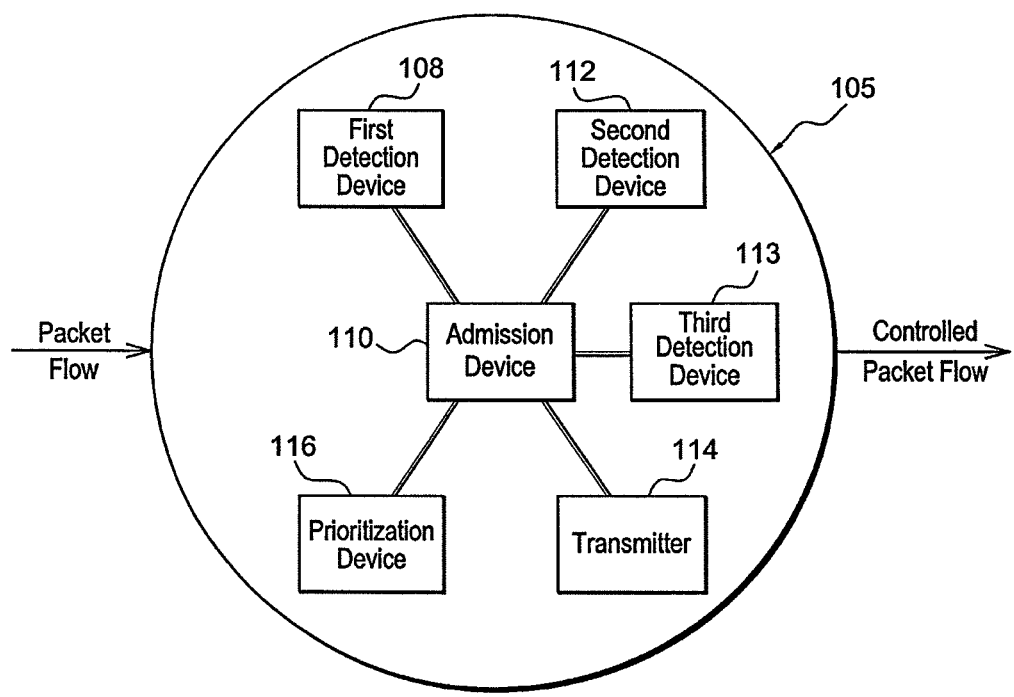
FIG. 5 is a diagram illustrating a primary node and the components thereof.

At step 22, a determination of available network bandwidth for transmission of the data packets across each of the links 107 of the communication route 100, is made. In an exemplary embodiment, each of the nodes 105, 106 comprises a first detection device 108, as shown in FIG. 5, for determining the amount of available network bandwidth across the link 107 between the respective node 105, 106 and the next successive node 105, 106. As an example, the first detection device 108 can be part of a packet RM. Because each node 105, 106 has a first detection device 108, the determination of the amount of available network bandwidth across the respective link 107 can be performed by every one of the nodes 105, 106.

In an exemplary embodiment, the determination of the availability of sufficient network bandwidth can comprise the steps of determining bandwidth available across a particular link 107; determining bandwidth required to transmit the data packet across the respective link 107 and comparing the required bandwidth with the available bandwidth across the respective link 107. Of course, the respective first detection device 108 could carry out these steps electronically. In another exemplary embodiment, the first detection devices 108 can read a specific message from the pseudo-wire traffic source explicitly indicating the packet rate and bandwidth required by the packet. Alternatively, the first detection devices 108 could utilize a counting mechanism to determine the number of packets per time interval. This could be combined with observation of the actual bandwidth required by the packet.

The first detection devices 108 can also be used to estimate the available network bandwidth on bandwidth-limited links. This value could be fixed for wired links or dependent on Received Signal Strength Indication (RSSI) and interference measurements for a wireless link. Also, the first detection devices 108 can be used to assign some or all of the available network bandwidth to support pseudo-wire traffic.

At step 24, a determination of whether to admit each of the data packets across each of the links 107 of the communication route 100, is made. In an exemplary embodiment, each of the nodes 105, 106 comprises an admission device 110 for making this determination. As an example, the admission device 110 can be part of a packet RM along with the respective first detection device 108. The admission determination is based on the previously determined amount of available network bandwidth. Accordingly, each of the admission devices 110 is in communication with the respective first detection device 108. If the required bandwidth of the data packet or data packets is within the available network bandwidth, the respective admission device 110 admits that data packet or data packets to the respective link 107. In the alternative, if the required bandwidth of the data packet or data packets exceeds the available network bandwidth, then the respective admission device 110 refrains from admitting that data packet or data packets to the respective link 107. Because each node 105, 106 has an admission device 110, the admission determination can be made by every one of the nodes 105, 106. As such, no information or resource metrics need to be exchanged between any of the edge elements 102, 104 for the network to stabilize and to admit only a quantity of data that does not exceed the capacity. There is no need for any resource metrics or information to be distributed to a separate call admission point. The admission can be determined by any of the primary or secondary nodes 105, 106. Furthermore, the acceptance (or rejection) of any particular packet is implicitly defined by the actual arrival of the flow itself.

At step 26, a determination of whether a bi-directional flow exists across the communication route 100, is made, as shown in FIG. 1. In a preferred embodiment, where there are multiple nodes 105, 106 in the communication route 100, only the primary nodes 105 will actually observe the directional flows and each of the primary nodes 105 will only observe one direction of flow. The primary nodes 105 will work in conjunction with one another to determine the existence of bi-directional flow. Each of the secondary nodes 106 will be capable of handling messages from both directions. When the primary node 105 connected to the first PE element 102 determines the required bandwidth, and determines a packet can be transported, the primary node 105 sends a message to the next successive secondary node 106 indicating the required bandwidth and that traffic flow identity of the packet. If the next successive secondary node 106 can also carry that traffic, that secondary node 106 will pass a message to the next successive secondary node 106. If all the nodes 105, 106 indicate that the respective links 107 have sufficient bandwidth capacity, the message will reach the primary node 105 connected to the second PE element 104. At this point, this primary node 105 sees both directions of flow, i.e., bi-directional flow.

It should be noted that the description above is an exemplary scenario where the first PE element 102 activates the packet flow and PE 104 activates the return flow in response thereto. In another exemplary embodiment, packet flow from each edge element 102, 104 can begin at the same time. In such a case, the messages will come from both directions and meet in the middle with the same result.

In an exemplary embodiment, each of the primary nodes 105 comprises a second detection device 112 for making this determination, as shown in FIG. 5. As an example, the second detection device 112 can be part of a packet RM along with the respective first detection device 108 and the respective admission device 110.

At step 28, a determination of whether to admit each of the data packets to the respective link 107 of the communication route 100 is made. The admission determination at a particular secondary node 106 is made by the respective admission device 110. In this case, the admission determination is based on the previously determined amount of available network bandwidth and whether bi-directional flow exists, as opposed to previously-mentioned step 24, where the admission determination was solely based on the previously determined amount of available network bandwidth. Accordingly, each of the admission devices 110 is in communication with the respective second detection device(s) 112 as well as the respective first detection device 108. If the required bandwidth of the data packet or data packets is within the available network bandwidth for the respective link 107 and bi-directional flow exists, the respective admission device 110 admits that data packet or data packets to the respective link 107. In the alternative, if the required bandwidth of the data packet or data packets exceeds the available network bandwidth for the respective link 107 and/or if bi-directional flow does not exist, then the respective admission device 110 refrains from admitting that data packet or data packets to the respective link 107. In an exemplary embodiment, the determination of whether bi-directional flow exists would only be carried out once the determination was made that the amount of available network bandwidth was sufficient to transmit the data packets across the respective link 107. In such a case, if the amount of available network bandwidth were insufficient, the determination of whether bi-directional flow exists would not be made because the packets would have already been dropped. Because each secondary node 106 has an admission device 110, the admission determination can be made by every one of the secondary nodes 106. In another exemplary embodiment, the method can include the step of blocking packet flow until bi-directional flow exists.

Figure 2:
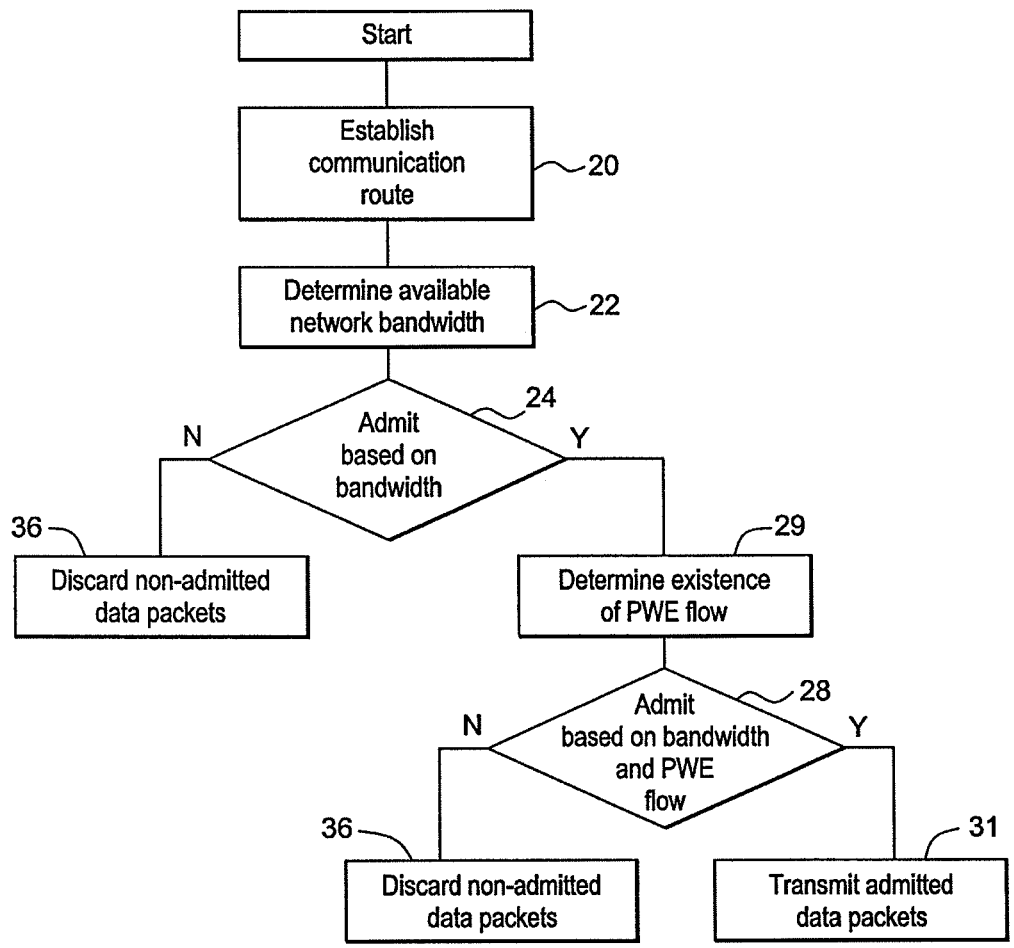
FIG. 2 is a flow diagram illustrating another embodiment of the invention including the step of determining admission based on available bandwidth and PWE flow.

As shown in FIG. 2, at step 29, a determination of whether a PWE flow exists across the communication route 100, is made. This determination is made in a manner similar to that in which the determination of whether a bi-directional flow exists is made. In a preferred embodiment, where there are multiple nodes 105, 106 in the communication route 100, only the primary nodes 105 will actually observe the PWE flows. The primary nodes 105 will work in conjunction with one another to determine the existence of PWE flow across the communication route 100. When the primary node 105 connected to the first PE element 102 determines the required bandwidth, and determines a packet can be transported, the primary node 105 sends a message to the next successive secondary node 106 indicating the required bandwidth and that traffic flow identity of the packet. If the next successive secondary node 106 can also carry that traffic, that secondary node 106 will pass a message to the next successive secondary node 106. If all the nodes 105, 106 indicate that the respective links 107 have sufficient bandwidth capacity, the message will reach the primary node 105 connected to the second PE element 104. At this point, this primary node 105 sees both directions of flow, i.e., bi-directional flow.

In an exemplary embodiment, each of the primary nodes 105 comprises a third detection device 113 for making this determination, as shown in FIG. 5. As an example, the third detection device 113 can be part of an RM along with the respective first detection device 108, the respective second detection device 112 (optionally) and the respective admission device 110.

At step 30, a determination of whether to admit each of the data packets to the respective link 107 of the communication route 100 is made. The admission determination at a particular secondary node 106 is made by the respective admission device 110. In this case, the admission determination is based on the previously determined amount of available network bandwidth and whether PWE flow exists, as opposed to previously-mentioned step 24, where the admission determination was solely based on the previously determined amount of available network bandwidth or step 28 where the admission determination was based on the previously determined amount of available network bandwidth and/or the existence of bi-directional flow. Accordingly, each of the admission devices 110 is in communication with the respective third detection device 113 as well as the respective first detection device 108. If the required bandwidth of the data packet or data packets is within the available network bandwidth and PWE flow exists, the respective admission device 110 admits that data packet or data packets to the respective link 107. In the alternative, if the required bandwidth of the data packet or data packets exceeds the available network bandwidth and/or if PWE flow does not exist, then the respective admission device 110 refrains from admitting that data packet or data packets to the respective link 107. In an exemplary embodiment, the determination of whether PWE flow exists would only be carried out once the determination that the amount of available network bandwidth was sufficient to transmit the data packets across the respective link 107. In such a case, if the amount of available network bandwidth were insufficient, the determination of whether PWE flow exists would not be made because the packets would have already been dropped.

In a preferred embodiment, the determination of whether to admit the data packets to a particular link 107 is based up on the amount of available network bandwidth, the existence of bi-directional flow and the existence of PWE flow. Here, the respective admission device 110 would make that admission determination if there is a sufficient amount of network bandwidth is available and bi-directional PWE flow exists. In such a case, each of the admission devices 110 would be in communication with the respective first, second and third detection devices 108, 112, 113. This step is indicated as step 33 in FIG. 3.

Once admission determinations have been made, step 31 of transmitting the admitted data packets across the respective link 107 can be performed. In an exemplary embodiment, each of the secondary nodes 106 comprises a transmitter 114 for transmitting the admitted packets. As an example, the transmitter 114 can be part of the packet RM.

Figure 3:
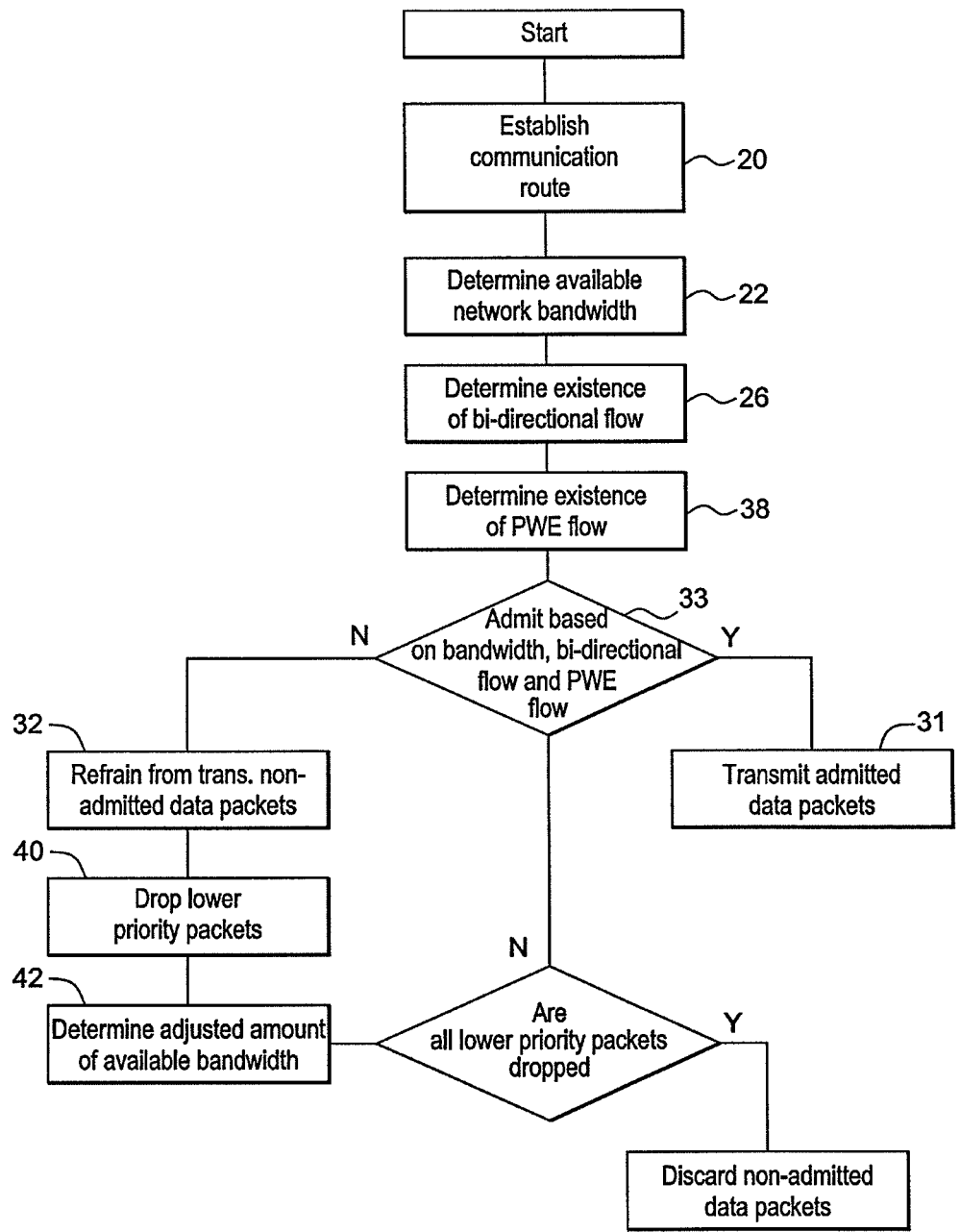
FIG. 3 is a flow diagram illustrating another embodiment of the invention.

As shown in FIG. 3, when a determination not to admit one or more data packets is made, step 32 of refraining from transmitting the respective data packets that are not admitted can be performed. In an exemplary embodiment of the invention, step 34 of transmitting the previously non-admitted data packets when a later determination is made to admit the previously non-admitted data packets can be included in the method. In doing so, the invention provides for situations where bandwidth availability changes or is altered.

In the event that a particular data packet is not admitted via any of the admission determination steps, the inventive method can include the step 36 of discarding any remaining non-admitted data packets, which is shown in FIGS. 1, 2 and 3. In an exemplary embodiment, each of the secondary nodes 106 could comprise a discard device (not shown) for performing the discarding any remaining non-admitted data packets.

In an exemplary embodiment, step 38 of separating the packets into at least a first group of higher priority packets and second group of lower priority packets can be included, as shown in FIG. 3. In an exemplary embodiment, each of the secondary nodes 106 comprises a prioritization device 116 for separating the packets into at least a first group and second group, as shown in FIG. 5. As an example, the prioritization device 116 can be part of the packet RM. Because each secondary node 106 can have a prioritization device 116, the separating based on priority can be made by every one of the secondary nodes 106. Although many options are possible, a preferred embodiment utilizes the RTP payload type field to indicate priority. The values of this field from 96-128 are available for user-specified operation by IETF standard RFC 3550 RTP (a Transport protocol for Real-Time applications). As an example, the values for the first group of higher priority packets range from 101-128, while the values for the second group of lower priority packets range from 96-100. This range is arbitrary. The packets can be separated into a plurality of groups of packets, wherein each packet is assigned a priority value and is assigned to one of the plurality of groups of packets based on the respective assigned priority value, i.e., the packets can be further sub-divided into more priority levels.

As shown in FIG. 3, in a case where the data packet flow could be admitted, but insufficient network bandwidth exists, the method can include step 40 of dropping a flow of at least one of the lower priority packets to liberate additional bandwidth. In such a case, the controlling of admissions could be done continuously. The dropped lower priority packet or packets would generate more available network bandwidth for use by higher priority packets. In a preferred embodiment, the system knows the total bandwidth consumed by the low-priority packets, and the minimum number of low priority flows should be dropped to enable transport of the high priority flow. In a case where dropping all the low priority flows would not free sufficient bandwidth to transport the high priority flow, then the low priority flows should not be dropped.

Where a lower priority packet is dropped, the step 42 of determining an adjusted amount of available bandwidth could be included in the inventive method. This adjusted amount of bandwidth would then be used as part of the admission determination criteria utilized by the admission devices 110 as part of the continuous controlling, e.g., a feedback loop. In a preferred embodiment, one or more lower priority packets are dropped only if the dropping thereof results in sufficient bandwidth to admit the higher priority packet in question. Each of the prioritization devices 116 is in communication with the respective admission device 110 and can perform the functions of dropping a lower priority packet in favor of a higher priority packet and determining an adjusted amount of available network bandwidth. Additionally, each of the prioritization devices 116 can communicate that additional bandwidth has become available to the respective admission device 110. Because each secondary node 106 has an admission device 110, the admission determination based on the adjusted amount of available network bandwidth (which would be continuously calculated), required bandwidth per packet flow, packet priority, the existence of bi-directional flow and existence of PWE flow can be made by every one of the secondary nodes 106.

In such a case, each of the transmitters 114 would transmit the respective data packets when the adjusted amount of available network bandwidth is sufficient to transmit the data packets across the respective link 107, when bi-directional flow exists, when PWE flow exists and when the priority of the respective data packet has been taken into consideration (via the prioritization device 116).

Because of the continuous nature of the aforementioned embodiment of the inventive method, additional changes or fluctuations in available network bandwidth can be accommodated. As an example, during conditions such as Rapid Spanning Tree Protocol (RSTP) switches, where the re-routed capacity may change, the call admission control system may elect to block additional calls based on that change in capacity. Also, during conditions that change available bandwidth capacity across a link, as are common, for example, in an unlicensed band wireless application, where bandwidth is not assured, the call admission control aspects of the inventive method can refrain from admitting, i.e., block, a data packet, even if the data packet is already in transit.

Additionally, the system can adjust the network bandwidth threshold based on observations of the link error rate, collision rate or wireless signal strength (RSSI). This allows for dynamic adjustment to local changes in the transmission environment, which allows the system to continue to use a specific admission device 110 at a reduced capacity without overloading the link. In addition to the basic behavior described above, the system can elect to use a different admission device 110 (at a different node 106) based on observations of signal strength (RSSI), error rate and collision rate. This could be achieved by adjusting the RSTP path cost of the link 107, such that a different link 107 is selected. This allows the system to switch to a different admission device 110 operating at full (or higher) capacity. This option could be modified to switch admission devices 110 only when the active admission device 110 is actually rejecting traffic die to its reduced capacity (if no data packets are being rejected, then switching does not gain any advantage and would actually introduce a transient error on the active PWE flows).

The present invention will be better understood in view of the following non-limiting examples.

EXAMPLE 1

An exemplary application is T1 transport over the CESoPSN version of PWE. A T1 consists of 8000 frames/second of 193 bits for a net bit rate of 1.544 Mbps. The 193 bits consist of 1 framing bit plus 24 Digital Signal Zeroes (DS0s) of 8 bits each. In CESoPSN, the system does not transport the entire T1, instead, the system transports the (operator) selected DS0s.

In order to create data packets, selected DS0s are taken from some number of T1 frames. The more frames there are, the larger the packet is and the longer the delay introduced by its creation is. The more DS0s that are selected, the larger the packet is, however, there is no delay effect associated therewith. Larger packets are more efficient to transport because the packet header is 62 bytes long and must be included in each packet.

Set A: With 32 frames/packet and all 24 DS0s selected, packet size is 62 header bytes plus 32 frames multiplied by 24 bytes/frame, which equals 830 bytes. A packet rate of 8000 frames/second divided by 32 frames/packet equals 250 packets/second per direction. The net bandwidth is 830 bytes at 8 bits/byte multiplied by 250 packets/second per direction, which equals 1.660 Mbps.

Set B: With 16 frames/packet and 12 DS0s selected, packet size is 62 header bytes plus 32 frames multiplied by 12 bytes/frame, which equals 254 bytes. A packet rate of 8000 frames/second divided by 16 frames/packet equals 500 packets/second per direction. The net bandwidth is 254 bytes at 8 bits/byte multiplied by 500 packets/second per direction, which equals 1.016 Mbps.

Again, an 802.11a or 802.11g Wireless Fidelity (Wi-Fi) link has a maximum peak modulation rate of 54 Mbps. However, this peak rate cannot be achieved as sustained throughput because Wi-Fi is a collision-based shared medium. As a result, packet guard times, acknowledgement (ACK) packets and Medium Access Control (MAC) layer preambles, as well as driver and chip set implementation details limit the effective rate. The ACK packets and guard times, in particular, limit the number of packets transferred over the link. The effective limit on packets is between 3200 and 3900 packets/ second (combined total for both directions). This limit will vary somewhat with the packet size. Furthermore, in the presence of interference, collisions or low signal levels, the Wi-Fi link will reduce the modulation rate, which will reduce the effective bit rate and the number of packets/second possible.

In one exemplary situation where the inventive system utilizes a packet RM with a link having little interference or noise, good received signal strength, and few collisions, the number of PWE packets allowed can be set to 1600/second per direction for a total of 3200 packets/second. When a new PWE data packet flow is detected, the packet rate is estimated by counting packets over a short, defined interval. If the current total packet rate plus the newly detected packet rate is less than the threshold rate, the capacity will be reserved for the new flow (it should be noted that for the purposes of this example, the requirement of bi-directional PWE flow and packet prioritization are not addressed).

If, at a particular packet RM, there are two flows conforming with Set B, supra. The current total packet rate is 1000 packets/second. To this is added one flow conforming to Set A, supra. This flow is admitted because the net rate of 1250 packets/second is below the threshold. Another flow conforming to Set B is identified offering an additional 500 packets/second. This flow would be rejected because the net rate of 1750 packets/second would be above the threshold. The packets of this flow would not be admitted to the radio interface.

Now, if another flow conforming to Set A is identified offering 250 packets/second, this traffic would be admitted because the net rate of 1500 packets/second is below the 1600 packets/second threshold. From this point forward, no flows (from Set A or Set B) can be admitted because the threshold would be exceeded.

EXAMPLE 2

Figure 6:
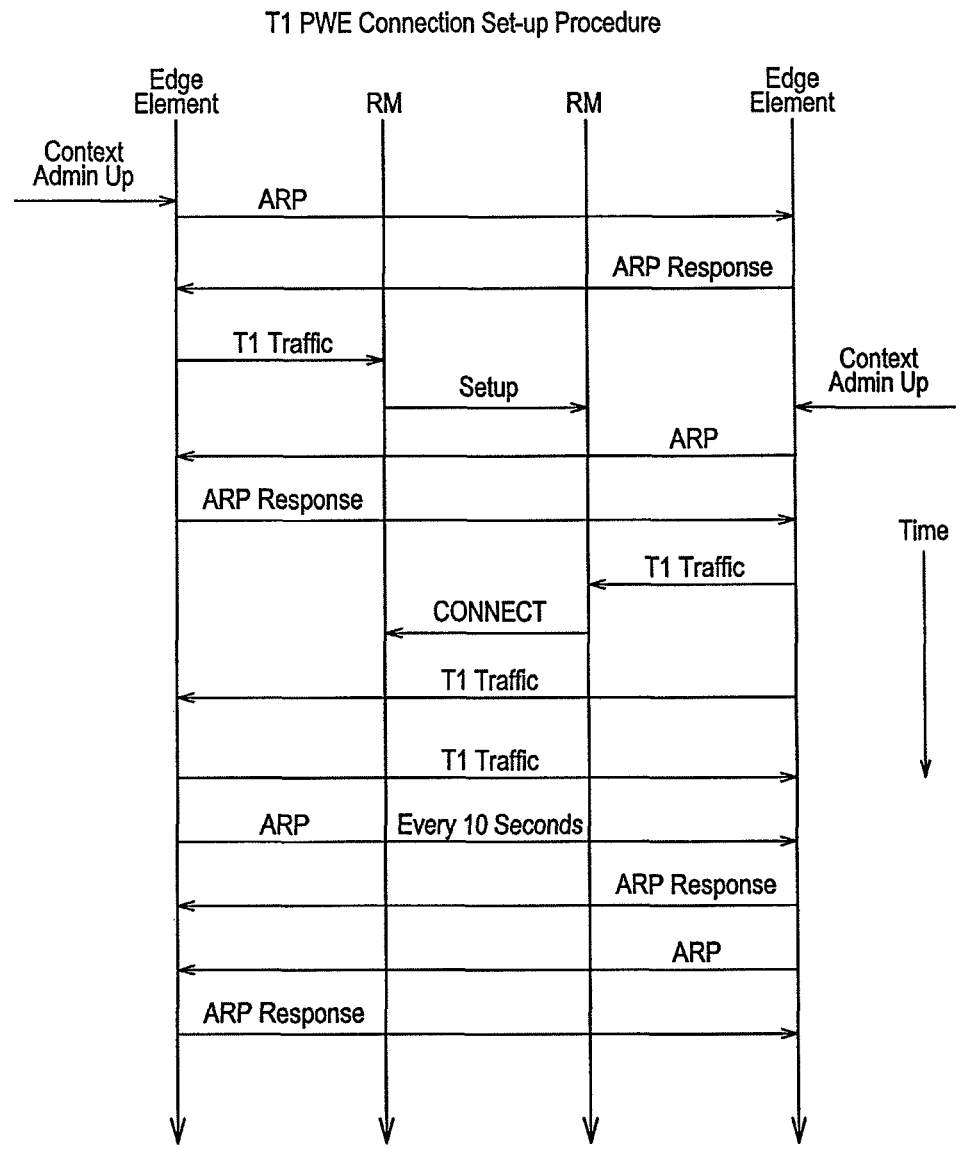
FIG. 6 is schematic illustrating an exemplary connection set-up procedure.

FIG. 6 shows an exemplary T1 PWE connection set-up procedure. In FIG. 6, timing flows from top to bottom. A first event, labeled "context admin up," indicates that the operator activates the PE element of a PWE traffic flow. This triggers an Address Resolution Protocol (ARP) message to determine if the destination is reachable. If it is not, ARPs will be repeated indefinitely until a response is received or the operator deactivates the flow. When the ARP request reaches the RE element, a response is generated and returned. At this point, the edge elements know they can communicate with one another, but they do not know whether the required network bandwidth is available.

Upon receiving the ARP response, the transmitting PE element begins generating traffic. This traffic is identified at the RM, which determines the required capacity and makes two decisions: is there capacity, and is there bi-directional PWE flow. In this case, there is capacity but no return flow. The RM sends a SETUP message identifying the PWE flow, priority and required capacity to the next successive RM. In this case, the next RM does not send a CONNECT response because it does not see the return PWE flow.

Now, the operator generated event, "context admin up," activates the other direction of the PWE flow originating from the other PE element. This triggers an ARP and the traffic starts when the ARP response is received. Now, the first RM can detect both directions of PWE flow (one directly and one indirectly via the SETUP message). If it has sufficient capacity (or a lower priority flow to bump to make capacity), it will send a CONNECT message and immediately start transmitting the packets.

When the first RM observes the CONNECT message, it will begin forwarding the traffic from the transmitting PE element. Traffic is now flowing in both directions and the PWE circuit is operating.

The ongoing ARP and ARP response is a mechanism to suppress the traffic at the transmitting PE element if the destination becomes completely unreachable.

EXAMPLE 3

Figure 7:
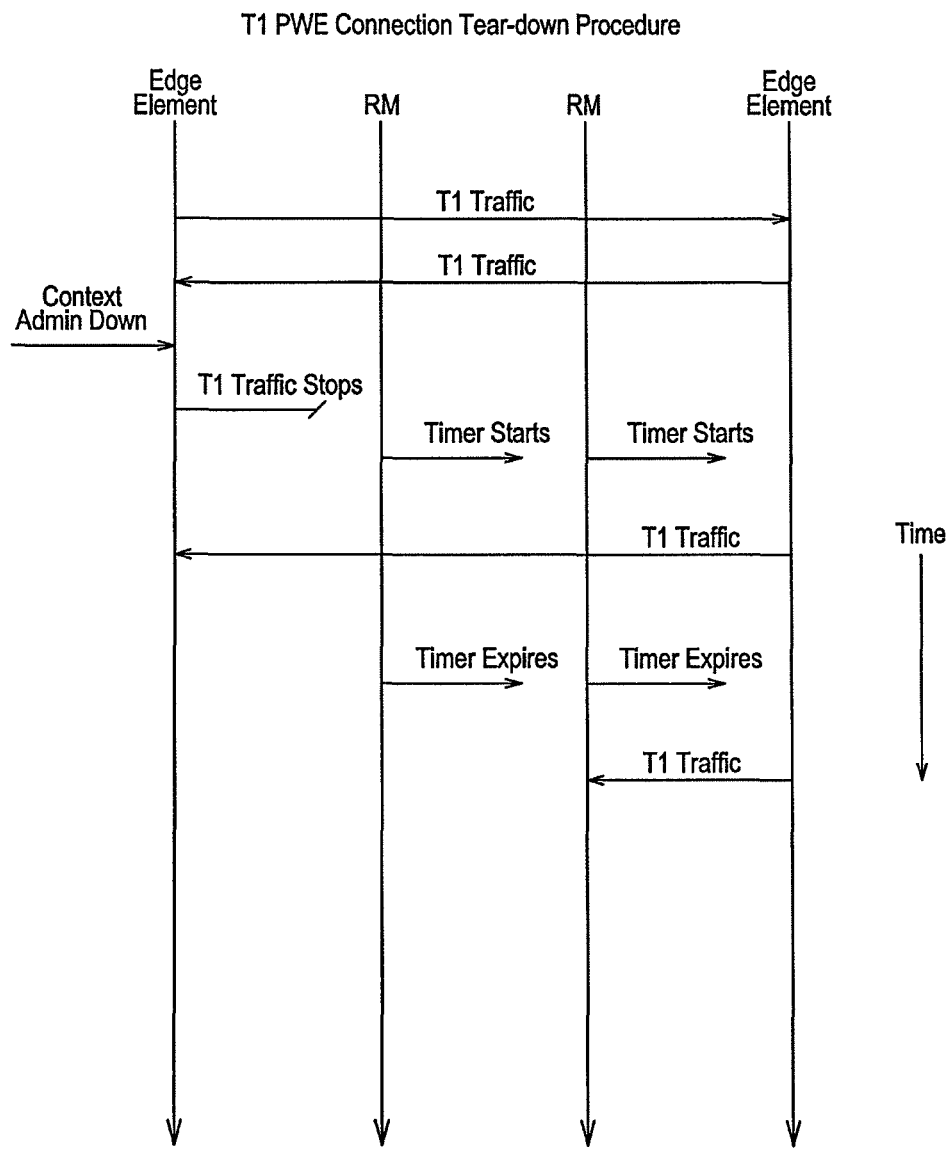
FIG. 7 is a schematic illustrating an exemplary shut down procedure.

FIG. 7 shows an exemplary T1 PWE connection tear-down procedure. In FIG. 7, timing flows from top to bottom. The halting of one direction of flow is shown. The RMs detect the interruption and start timers. If the traffic does not resume, the timers expire and the flow is recognized as uni-directional. The first RM blocks the remaining direction of traffic flow. Both RMs release the capacity reserved for this flow and make it available for a new flow or possible re-establishment of the current flow.

The following non-limiting examples demonstrate the ability of the invention to handle more complex cases, e.g., redundant network paths, multiple redundant network paths, and multiple provider edge nodes. In these types of complex cases, if failures collapse too much traffic onto a single link, prior systems would randomly discard traffic thereby rendering all the PWE useless because too many dropped packets results in too much noise and an inability to recover appropriate timing. In the inventive system and method, specific PWEs (low priority first) are dropped completely and those that are admitted are transported error free. Further, the invention can protect against network over-subscription by configuration error, in cases where the network configuration begins with overloaded link(s).

EXAMPLE 4

Figure 8:
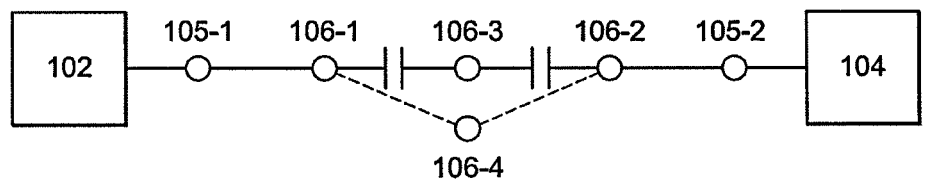
FIG. 8 shows an initial path between provider edge elements.

FIG. 8 shows an initial path established between the first and second PE elements 102, 104. The path includes primary nodes 105-1 and 105-2, and secondary nodes 106-1, 106-2 and 106-3. Additionally secondary node 106-4 is adjacent to the established path, but does not initially observe traffic. If a failure breaks one of the links into 106-3, or if 106-3 ceases operation, the traffic path can be adjusted to flow through node 106-4. The traffic is already flowing through segments 102, 105-1 and 106-1 and segments 104, 105-2, 106-2. In this case, node 106-4 will now observe the actual PWE traffic from both directions. Node 106-4 will detect the flows from both directions (recognize the flows are two halves of a bi-directional pair), verify sufficient bandwidth exists and start forwarding the traffic. This scenario could also occur in the dynamic case if interference causes the path to be switched before the original link goes down.

EXAMPLE 5

Figure 9:
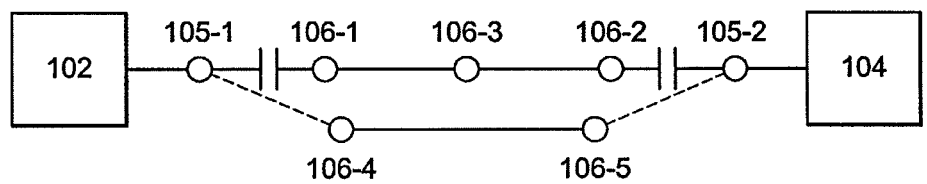
FIG. 9 shows an initial path utilized in Example 4.

FIG. 9 shows the same initial path as utilized in Example b 4. Additionally, secondary nodes 106-4 and 106-5 (which are connected to one another) are adjacent to the established path, but do not initially observe traffic. If the connection is lost at node 106-2 and node 106-1, the traffic path can be adjusted to flow through the node 106-4, 106-5 segment. In this case, 106-4, 106-5 segment would observe the traffic and exchange messages, just as 105-1 and 105-2 did in the initial setup.

Furthermore, in a fully redundant mesh multiple segments could be replaced as required, i.e., the process can be repeated.

EXAMPLE 6

Figure 10:
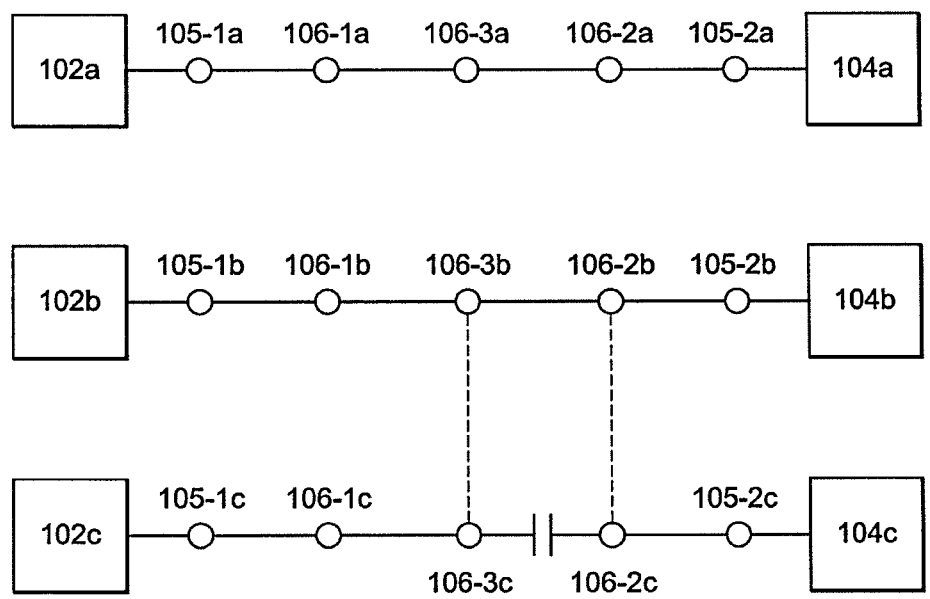
FIG. 10 shows a scenario having multiple provider edge elements.

FIG. 10 shows a scenario where there are multiple PE elements 102a, b and c; and 104a, b and c. A node which takes the primary role for one pair of PE elements may take the secondary role for a different pair. There might be a central telecommunications office (CO) where all the second PE elements are located, while the first PE elements are geographically distributed at customer sites and connected by a mesh of nodes. The PWE traffic originating at 102a, 102b and 102c each has a unique path to the respective PE element 104a, 104b and 104c (each of which are located at the CO). For example, each first PE element can originate one high priority flow and two low priority flows, all of which fit in the capacity of the dedicated respective link(s). If the link between node 106-3c and node 106-2c fails, the traffic from 102-3 will be re-directed onto the link between 106-3b, 106-2b link. If there is sufficient bandwidth, the traffic flow proceeds. If there is not sufficient bandwidth, the low priority traffic from 102c will be refused first; then the high priority traffic from 102c may case the low priority traffic from 102b to be dropped. If another failure occurs, then all of the traffic may be directed onto a single link and further low priority traffic would be dropped to create space for high priority traffic.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for controlling admissions of data packets across a packet network, the method comprising the steps of:
    establishing a communication route on a shared medium from a first provider edge (PE) element to a second provider edge element with (i) at least one primary node connected to each edge element to establish a link and (ii) a plurality of secondary nodes disposed between the primary nodes of the edge elements with each node establishing a link with the next successive node and the links combining to establish the communication route, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;
    using a detection device to determine, at each node, an amount of available network bandwidth for transmission of the data packets across each of the links of the communication route; and
    using an admission device to determine, at each node, whether to admit the data packets to each of the links of the communication route based on (i) the at least one predetermined, fixed port number, (ii) the determined priority of packets, and (iii) the determined amount of available network bandwidth across the respective link, wherein the step of using an admission device to determine whether to admit is performed at each of the respective secondary nodes, without exchanging network bandwidth metrics between the first provider edge element and the second provider edge element through the secondary nodes, and without sending a bandwidth metric signal back to the edge element from which the data packet came.

2. The method of claim 1, further comprising the step of:
    determining whether or not bi-directional flow exists across the communication route when the amount of available network bandwidth is sufficient to transmit the data packets across the communication route.

3. The method of claim 1, further comprising the step of:
    determining whether or not PWE flow exists across the communication route when the amount of available network bandwidth is sufficient to transmit the data packets across the communication route.

4. The method of claim 1, wherein the step of using a detection device to determine an amount of available network bandwidth comprises the steps of:
    using a respective detection device to determine bandwidth available across each of the links of the communication route;
    using the respective detection device to determine bandwidth required to transmit the data packet across each of the links of the communication route; and
    comparing the required bandwidth with the respective available bandwidth for each link.

5. The method of claim 1, wherein the controlling of admissions operates continuously.

6. The method of claim 5, further comprising the step of:
    adjusting the determined amount of available network bandwidth across at least one of the links of the communication route.

7. The method of claim 6, wherein the determination of an amount of available network bandwidth is based upon the adjusted amount of available network bandwidth.

8. The method of claim 1, further comprising:
    separating the packets into a plurality of groups of packets, wherein each packet is assigned a priority value and is assigned to one of the plurality of groups of packets based on the respective assigned priority value.

9. A method for controlling admissions of data packets across a packet network, the method comprising the steps of:
    establishing a communication route on a shared medium from a first provider edge (PE) element to a second provider edge element with (i) at least one primary node connected to each edge element to establish a link and (ii) a plurality of secondary nodes disposed between the primary nodes of the edge elements with each node establishing a link with the next successive node and the links combining to establish the communication route, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;
    using a detection device to determine, at each node, an amount of available network bandwidth for transmission of the data packets across each of the links of the communication route;
    determining whether a bi-directional flow exists in the communication route; and
    using an admission device to determine, at each node, whether to admit the data packets to each of the links of the communication route based on (i) the at least one predetermined, fixed port number, (ii) the determined priority of packets, (iii) the determined amount of available network bandwidth across the respective link, and (iv) the determination of whether or not bi-directional flow exists, wherein the step of using an admission device to determine whether to admit is performed at each of the respective secondary nodes, without exchanging network bandwidth metrics between the first provider edge element and the second provider edge element through the secondary nodes.

10. The method of claim 9, further comprising the step of: blocking packet flow until bi-directional flow exists.

11. A method for controlling admissions of data packets across a packet network, the method comprising the steps of:
establishing a communication route on a shared medium from a first provider edge (PE) element to a second provider edge element with (i) at least one primary node connected to each edge element to establish a link and (ii) a plurality of secondary nodes disposed between the primary nodes of the edge elements with each node establishing a link with the next successive node and the links combining to establish the communication route, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;
using a detection device to determine, at each node, an amount of available network bandwidth for transmission of the data packets across each of the links of the communication route;
determining, at each secondary node, whether a pseudo-wire emulation (PWE) flow exists across the communication route; and
using an admission device to determine, at each node, whether to admit the data packets to each of the links of the communication route based on (i) the at least one predetermined, fixed port number, (ii) the determined priority of packets, (iii) the determined amount of available network bandwidth across the respective link, and (iv) the determination of whether or not PWE flow exists, wherein the step of using an admission device to determine whether to admit is performed at each of the respective secondary nodes, without exchanging network bandwidth metrics between the first provider edge element and the second provider edge element through the secondary nodes.

12. A method for controlling admissions of data packets across a packet network, the method comprising the steps of:
establishing a communication route on a shared medium from a first provider edge (PE) element to a second provider edge element with at least one primary node connected to each edge element to establish a link and a plurality of secondary nodes disposed between the primary nodes of the edge elements with each node establishing a link with the next successive node and the links combining to establish the communication route, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;
using a detection device to determine, at each node, an amount of available network bandwidth for transmission of the data packets across each of the links of the communication route;
determining whether a bi-directional flow exists in the communication route;
determining, at each secondary node, whether a pseudo-wire emulation (PWE) flow exists across the communication route; and
using an admission device to determine, at each node, whether to admit the data packets to each of the links of the communication route based on (i) the at least one predetermined, fixed port number, (ii) the determined priority of packets, (iii) the determined amount of available network bandwidth across the respective link, and (iv) the determination of whether or not PWE flow exists, wherein the step of using an admission device to determine whether to admit is performed at each of the respective secondary nodes, without exchanging network bandwidth metrics between the first provider edge element and the second provider edge element through the secondary nodes.

13. The method of claim 12, further comprising the step of: when a determination not to admit one or more data packets is made, refraining from transmitting the one or more data packets that are not admitted.

14. The method of claim 13, further comprising the step of: when a later determination to admit the previously non-admitted data packets is made, transmitting the previously non-admitted data packets.

15. The method of claim 13, further comprising the step of: discarding non-admitted packets.

16. The method of claim 12, further comprising the step of: separating the packets into at least a first group of higher priority packets and second group of lower priority packets.

17. The method of claim 16, further comprising the steps of:
dropping a flow of at least one of the lower priority packets to liberate additional bandwidth; and
determining an adjusted amount of available bandwidth.

18. The method of claim 17, wherein the step of using an admission device to determine whether to admit further comprises the step of transmitting the respective data packets across the respective link of the communication route when the adjusted amount of available network bandwidth is sufficient to transmit the data packets across the respective link of the communication route, bi-directional flow exists, and PWE flow exists.

19. The method of claim 18, further comprising the step of: when a determination not to admit one or more data packets is made, refraining from transmitting the one or more data packets that are not admitted.

20. The method of claim 19, further comprising the step of: when a later determination to admit the previously non-admitted data packets is made, transmitting the previously non-admitted data packets.

21. The method of claim 16, further comprising:
dropping a flow of at least one of the admitted lower priority packets in favor of a higher priority packet.

22. A system for controlling admissions of data packets across a packet network, the system comprising:
a first provider edge (PE) element;
a second provider edge element;
at least one primary node connected to each edge element to establish a link;

a plurality of secondary nodes disposed between primary nodes of the first and second edge elements;

each node establishing a link on a shared medium with the next successive node;

the links combining to establish a communication route between the edge elements, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;

each of the nodes comprising at least one first detection device for determining an amount of available network bandwidth for transmission of the data packets across the respective link of the communication route; and each of the nodes comprising at least one admission device in communication with the respective first detection device for determining whether to admit the data packets to the respective link of the communication route based on (i) the at least one predetermined, fixed port number, (ii) the determined priority of packets, and (iii) the determined amount of available network bandwidth, without exchanging network bandwidth metrics between the first provider edge element and the second provider edge element through the secondary nodes, and without sending a bandwidth metric signal back to the edge element from which the data packet came.

23. The system of claim 22, wherein each of the first detection devices determines the respective amount of available network bandwidth by:

determining bandwidth available on the respective link of the communication route;

determining bandwidth required to transmit the data packet across the respective link of the communication route; and comparing the required bandwidth with the respective available bandwidth.

24. The system of claim 22, wherein each of the nodes further comprises a prioritization device for separating the data packets into at least a first group of higher priority packets and second group of lower priority packets.

25. The system of claim 24, wherein each of the prioritization devices is configured to perform the steps of:

dropping a flow of at least one of the lower priority packets to liberate additional bandwidth; and determining an adjusted amount of available bandwidth across the respective link.

26. The system of claim 25, wherein each of the admission devices determines whether to admit the data packets to the communication route based (i) the adjusted amount of available network bandwidth, (ii) whether or not a bi-directional flow exists, and (iii) whether or not a PWE flow exists.

27. The system of claim 26, wherein each of the secondary nodes further comprises a transmitter for transmitting the respective data packets across the respective link of the communication route when the adjusted amount of available network bandwidth is sufficient to transmit the data packets across the communication route, bi-directional flow exists, and PWE flow exists.

28. The system of claim 27, wherein each of the transmitters refrains from transmitting the one or more data packets that are not admitted when a determination not to admit one or more data packets is made.

29. The system of claim 28, wherein each of the transmitters transmits the previously non-admitted data packets when a later determination to admit the previously non-admitted data packets is made.

30. The system of claim 29, wherein the system is configured to operate continuously.

31. The system of claim 30, wherein each of the prioritization devices continuously adjusts the determined amount of available network bandwidth across the respective link.

32. The system of claim 31, wherein the step of determining the availability of sufficient network bandwidth across each of the links is performed continuously and is based upon the continuously adjusted amount of available network bandwidth across the respective link.

33. The system of claim 32, wherein each of the prioritization devices drops a flow of at least one of the admitted lower priority packets in favor of a higher priority packet.

34. The system of claim 24, wherein each of the prioritization devices separates the packets into a plurality of groups of packets, wherein each packet is assigned a priority value and is assigned to one of the plurality of groups of packets based on the respective assigned priority value.

35. A system for controlling admissions of data packets across a packet network, the system comprising:

a first provider edge (PE) element;

a second provider edge element;

at least one primary node connected to each edge element to establish a link;

a plurality of secondary nodes disposed between primary nodes of the first and second edge elements;

each node establishing a link on a shared medium with the next successive node;

the links combining to establish a communication route between the edge elements, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;

each of the nodes comprising at least one first detection device for determining an amount of available network bandwidth for transmission of the data packets across the respective link of the communication route;

each of the primary nodes comprises at least one second detection device for determining whether a bi-directional flow exists across the communication route; and each of the nodes comprising at least one admission device in communication with the respective first and second detection devices for determining whether to admit the data packets to the respective link of the communication route based on (i) the at least one predetermined, fixed port number, (ii) the determined priority of packets., (iii) the determined amount of available network bandwidth across the respective link, and (iv) whether or not bi-directional flow exists, without exchanging network bandwidth metrics between the first provider edge element and the second provider edge element through the secondary nodes.

36. A system for controlling admissions of data packets across a packet network, the system comprising:

a first provider edge (PE) element;

a second provider edge element;

at least one primary node connected to each edge element to establish a link;

a plurality of secondary nodes disposed between primary nodes of the first and second edge elements;

each node establishing a link on a shared medium with the next successive node;

the links combining to establish a communication route between the edge elements, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;

each of the nodes comprising at least one first detection device for determining an amount of available network bandwidth for transmission of the data packets across the respective link of the communication route;

each of the primary nodes comprises at least one second detection device for determining whether a PWE flow exists across the communication route; and each of the nodes comprising at least one admission device in communication with the respective first, and second detection devices for determining whether to admit the data packets to the respective link of the communication route based on (i) the at least one predetermined, fixed port number, (ii) the determined priority of packets, (iii) the determined amount of available network bandwidth, and (iv) whether or not PWE flow exists, without exchanging network bandwidth metrics between the first provider edge element and the second provider edge element through the secondary nodes.

37. A system for controlling admissions of data packets across a packet network, the system comprising:

a first provider edge (PE) element;

a second provider edge element;

at least one primary node connected to each edge element to establish a link;

a plurality of secondary nodes disposed between primary nodes of the first and second edge elements;

each node establishing a link on a shared medium with the next successive node;

the links combining to establish a communication route between the edge elements, wherein each of a plurality of Universal Data Protocol (UDP) packets transmitted across the packet network has at least one predetermined, fixed port number, and wherein each of the secondary nodes utilizes a Real-Time Transport Protocol (RTP) payload type field to determine priority of packets containing the predetermined fixed port number;

each of the nodes comprising at least one first detection device for determining an amount of available network bandwidth for transmission of the data packets across the respective link of the communication route;

each of the primary nodes comprises at least one second detection device for determining whether a bi-directional flow exists across the communication route;

each of the primary nodes comprises at least one third detection device for determining whether a PWE flow exists across the communication route; and each of the nodes comprising at least one admission device in communication with the respective first, second, and third detection devices for determining whether to admit the data packets to the respective link of the communication route based on (i) the at least one predetermined, fixed port number, (ii) the determined priority of packets, (iii) the determined amount of available network bandwidth, (iv) whether or not bi-directional flow exists, and (v) whether or not PWE flow exists, without exchanging network bandwidth metrics between the first provider edge element and the second provider edge element through the secondary nodes.

38. The system of claim 37, wherein each of the nodes further comprises a transmitter for transmitting the respective data packets across the communication route when the amount of available network bandwidth is sufficient to transmit the data packets across the respective link, bi-directional flow exists, and PWE flow exists.

39. The system of claim 38, wherein each of the transmitters refrains from transmitting the one or more data packets that are not admitted when a determination not to admit one or more data packets is made.

40. The system of claim 39, wherein each of the transmitters transmits the previously non-admitted data packets when a later determination to admit the previously non-admitted data packets is made.

* * * * *

UNITED STATES PATENT AND TRADEMARK OFFICE
CERTIFICATE OF CORRECTION

PATENT NO. : 8,472,315 B2  
APPLICATION NO. : 12/027894  
DATED : June 25, 2013  
INVENTOR(S) : Sommerville et al.

Page 1 of 2

It is certified that error appears in the above-identified patent and that said Letters Patent is hereby corrected as shown below:

On the Title page, in the Figure, delete " 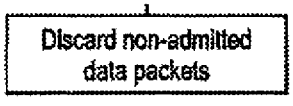 " and insert 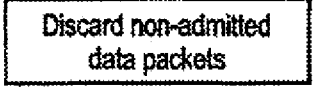 --, therefor.

In the Drawings

In Fig. 3, Sheet 3 of 10, delete " 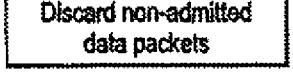 " and insert 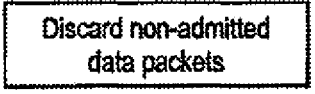 --, therefor.

In the Specifications

In Column 3, Line 2, delete "non-admitted packets." and insert -- non-admitted data packets. --, therefor.

In Column 5, Line 1, delete "but the with the" and insert -- but with the --, therefor.

In Column 12, Lines 60-61, delete "Example b 4." and insert -- Example 4. --, therefor.

Signed and Sealed this  
Twenty-fifth Day of March, 2014

Michelle K. Lee  
*Deputy Director of the United States Patent and Trademark Office*

CERTIFICATE OF CORRECTION (continued)
U.S. Pat. No. 8,472,315 B2

In the Claims

In Column 15, Line 33, in Claim 15, delete "non-admitted packets." and insert -- non-admitted data packets. --, therefor.

In Column 18, Line 53, in Claim 35, delete "packets.," and insert -- packets, --, therefor.